United States Patent [19]
Hagersten et al.

[11] Patent Number: 5,893,150
[45] Date of Patent: Apr. 6, 1999

[54] EFFICIENT ALLOCATION OF CACHE MEMORY SPACE IN A COMPUTER SYSTEM

[75] Inventors: Erik E. Hagersten, Palo Alto; Mark D. Hill, Los Altos, both of Calif.

[73] Assignee: Sun Microsystems, Inc., Mountain View, Calif.

[21] Appl. No.: 675,306

[22] Filed: Jul. 1, 1996

[51] Int. Cl.[6] .................................................. G06F 12/12
[52] U.S. Cl. .......................................... 711/139; 711/133
[58] Field of Search .................................. 395/460, 461, 395/462, 463, 465, 466, 472; 711/133, 134, 135, 136, 138, 139, 145

[56] References Cited

U.S. PATENT DOCUMENTS

| | | | |
|---|---|---|---|
| 5,535,116 | 7/1996 | Gupta et al. | 364/134 |
| 5,586,296 | 12/1996 | Bernstein et al. | 711/138 |
| 5,625,793 | 4/1997 | Mirza | 711/138 |

FOREIGN PATENT DOCUMENTS 2 273 181  6/1994  United Kingdom .

OTHER PUBLICATIONS

Hennessy et al., "Computer Architecture A Quantitative Approach," 1990, p. 413.

Walsh S. J., et al: "Pollution Control Caching", International Conference On Computer Design: VLSI In Computers And Processors, Austin, Oct. 2–4, 1995, Oct. 2, 1995, Institute Of Electrical And Electronics Engineers, pp. 300–306, XP000631924.

Dalgren, et al: "Combined Performance Gains Of Simple Cache Protocol Extensions", *Computer Architecture News*, vol. 22, No. 2, Apr. 1, 1994, pp. 187–197, XP000450350.

*Primary Examiner*—Eddie P. Chan
*Assistant Examiner*—Kevin L. Ellis
*Attorney, Agent, or Firm*—Conley, Rose & Tayon, PC; B. Noel Kivlin

[57] ABSTRACT

An efficient cache allocation scheme is provided for both uniprocessor and multiprocessor computer systems having at least one cache. In one embodiment, upon the detection of a cache miss, a determination of whether the cache miss is "avoidable" is made. In other words, would the present cache miss have occurred if the data had been cached previously and if the data had remained in the cache. One example of an avoidable cache miss in a multiprocessor system having a distributed memory architecture is an excess cache miss. An excess cache miss is either a capacity miss or a conflict miss. A capacity miss is caused by the insufficient size of the cache. A conflict miss is caused by insufficient depth in the associativity of the cache. The determination of the excess cache miss involves tracking read and write requests for data by the various processors and storing some record of the read/write request history in a table or linked list. Data is cached only after an avoidable cache miss has occurred. By caching only after at least one avoidable cache miss instead of upon every (initial) access, cache space can be allocated in a highly efficient manner thereby minimizing the number of data fetches caused by cache misses.

28 Claims, 4 Drawing Sheets

EFFICIENT ALLOCATION OF CACHE MEMORY SPACE IN A COMPUTER SYSTEM

BACKGROUND OF THE INVENTION

1. Field of the Invention

This invention relates to caches of computer systems. In particular, this invention relates to the efficient allocation of cache memory space in a computer system.

2. Description of the Related Art

In a simple cache space allocation scheme for a multi-level-cache computer system having a small first-level cache and a larger second-level cache, all data structures are automatically cached in both levels of caches. If the size of a data structure is larger than the smaller lower-level cache, i.e., the data structure does not fit into the lower-level cache, the data structure is replaced from the lower-level cache. Hence, if the data structure is smaller than the larger higher-level cache, most of the content of the data structure will remain in the higher-level cache.

Unfortunately, while some data structures are accessed frequently, other data structures are accessed only once and it is not easy to predict future access(es) of a particular structure without some statistical analysis and/or knowledge of the computer program which owns the data structure(s). For example, a computer program may use a large array by accessing each element of the array once. Each element is then used in a fairly complicated computation involving temporary variables. In this example, caching every element of the large array will not substantially increase the computational speed. In contrast, caching the temporary variables will result in a faster execution of the program.

Hence, although the above-described scheme for allocating space in a multi-level cache is simple, the scheme is based solely on the size of the data structure, and hence is inefficient because a substantial number of data structures are unnecessarily cached. Excessive caching causes other useful data structures to be replaced prematurely, i.e., ejected from the cache(s) before subsequent accesses.

Since cache memories are not infinitely large, efficient allocation of limited cache resources is needed in order to maximize usage of the caches and minimize overall access time to data. Thus there is a need for an efficient mechanism to select data structures for caching which also optimizes the allocation of cache memory space in a multi-level-cache computer system.

SUMMARY OF THE INVENTION

The present invention provides an efficient cache allocation scheme for both uniprocessor and multiprocessor computer systems having at least one cache.

In one embodiment, upon the detection of a cache miss, a determination of whether the cache miss is "avoidable" is made. In other words, a determination is made whether the present cache miss would have occurred if the data had been cached previously, and if the data had remained in the cache.

One example of an avoidable cache miss in a multiprocessor system having a distributed memory architecture is an excess cache miss. An excess cache miss is either a capacity miss or a a conflict miss. A capacity miss is caused by the insufficient size of the cache. A conflict miss is caused by insufficient depth in the associativity of the cache. The determination of the excess cache miss involves tracking read and write requests for data by the various processors and storing some record of the read/write request history in a table or linked list. For example, tracking the identity of the last writer of a data structure provides an indication as to whether the present cache miss was avoidable, had the data not been replaced prior to the present cache miss.

In the case of a simpler uniprocessor system, since the single processor has sole access to the cache, an avoidable cache miss applies to data that was previously accessed, i.e., data that has been cached and replaced prior to the present cache miss.

In accordance with the present invention, the data is cached only after an avoidable cache miss has occurred. By caching only after at least one avoidable cache miss instead of upon every access, cache space can be allocated in a highly efficient manner, thereby minimizing the number of data fetches caused by cache misses. This is because statistically the likelihood of data being accessed again increases dramatically if it has previously been accessed at least twice.

Depending on the cache coherency protocol, it may be necessary to replace displaced data, i.e., write back the data to the main memory/owner subsystem, before discarding the displaced data.

DESCRIPTION OF THE DRAWINGS

The objects, features and advantages of the system of the present invention will be apparent from the following description in which.

DETAILED DESCRIPTION OF THE INVENTION

In the following description, numerous details provide a thorough understanding of the invention. These details include functional blocks and an exemplary cache architecture to aid implementation of an efficient scheme for allocating cache memory space within a computer system. In addition, while the present invention is described with reference to a specific cache allocation scheme for a distributed cache of a multiprocessor computer system, the invention is applicable to a wide range of caches and computer architectures. In other instances, well-known circuits and structures are not described in detail so as not to obscure the invention unnecessarily.

Figure 1A:
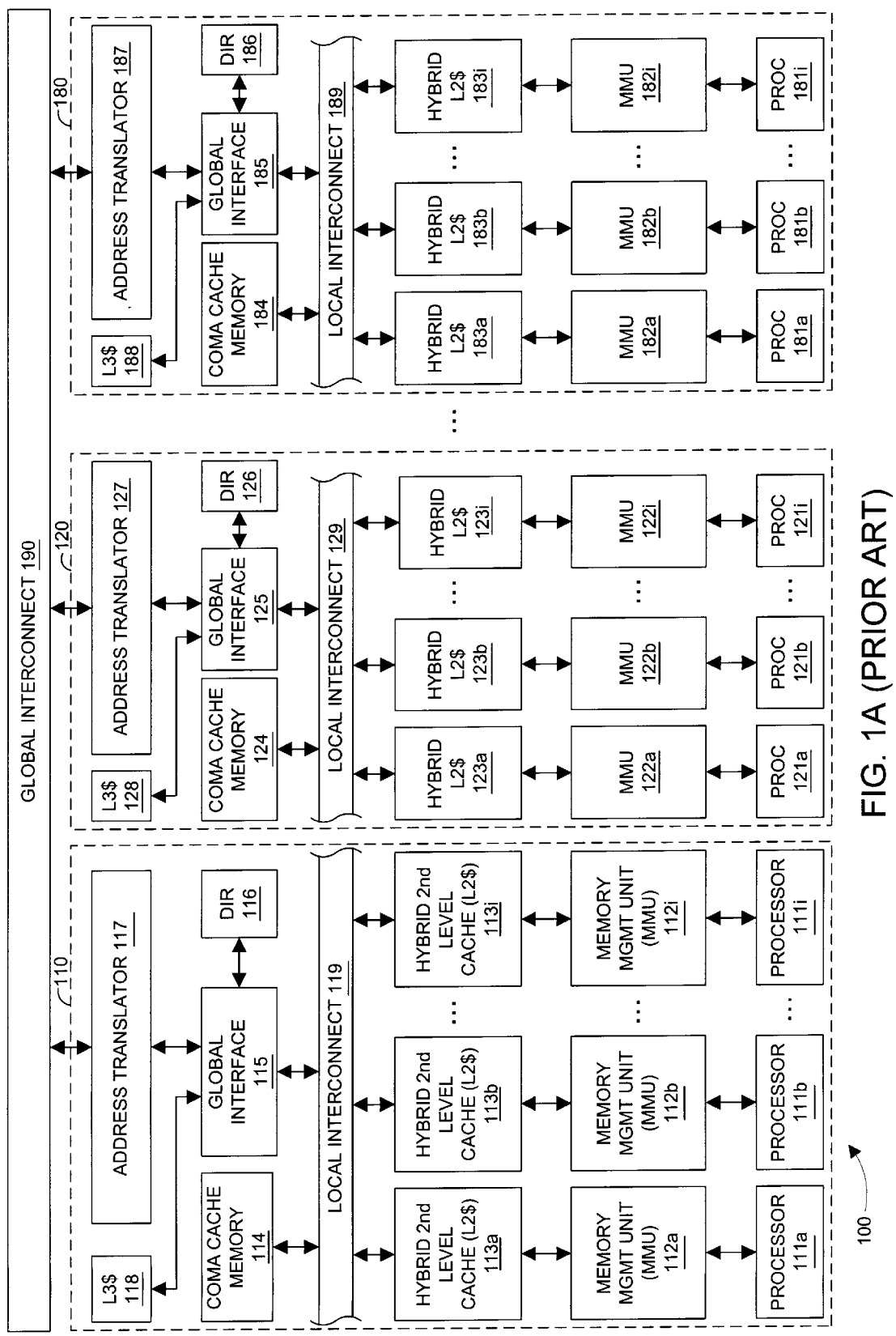
FIG. 1A is a block diagram showing a networked computering system 100 with a hybrid cache-only memory architecture/non-uniform memory architecture (COMA/NUMA).
Figure 1B:
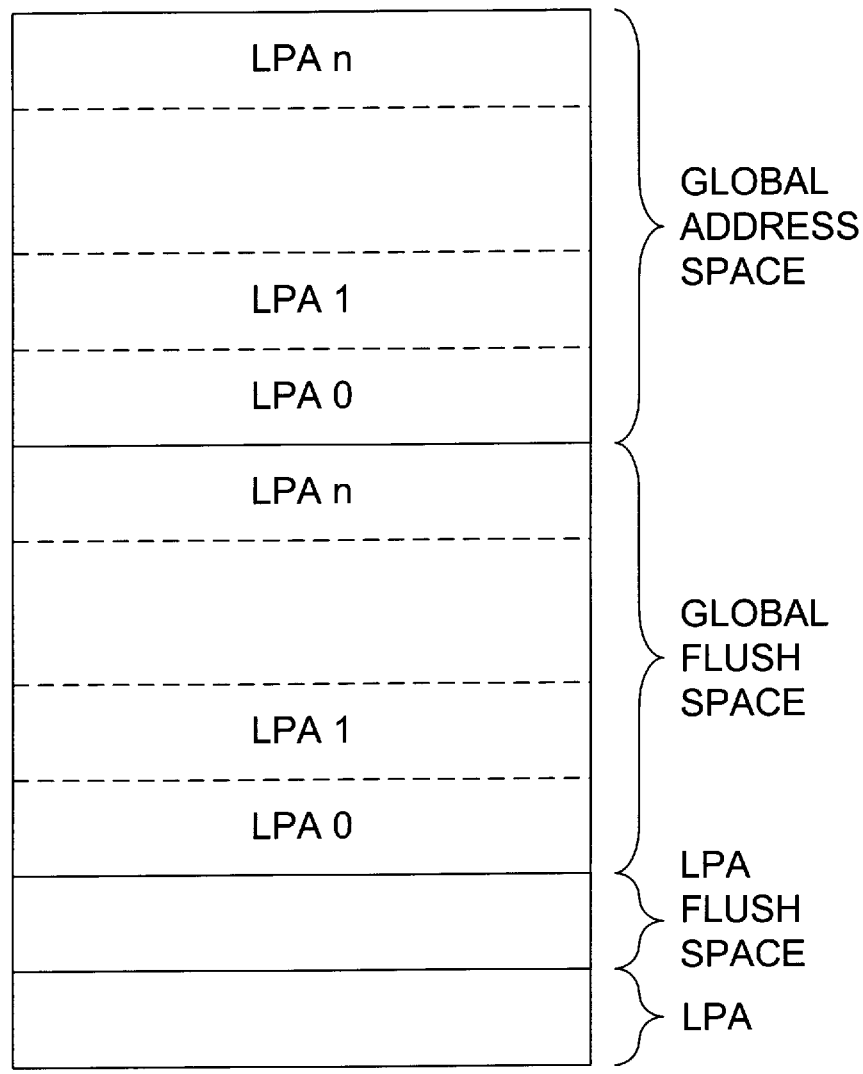
FIG. 1B is an exemplary memory map for a networked computering system of FIG. 1A.

FIG. 1A is a block diagram showing a hybrid COMA/NUMA computer system 100. System 100 includes a plurality of subsystems 110, 120, ... 180, coupled to each other via a global interconnect 190. Each subsystem is assigned a unique network node address. Each subsystem includes one or more processors, a corresponding number of memory management units (MMUs) and hybrid second-level caches (L2$s), a COMA cache/memory, a global interface, a third-level cache (L3$) and a local interconnect. For example, subsystem 110 includes processors 111a, 111b ... 111i, MMUs 112a, 112b, ... 112i, L2$s 113a, 113b, ... 113i, COMA cache/memory 114, global interface 115, L3$ 118 and local interconnect 119. Each of processors 111a, 111b, ... 111i may include an optional compact first level cache.

In order to support a directory-based cache coherency scheme, subsystems 110, 120, ... 180 also include directories 116, 126, . . . 186 coupled to global interfaces 115, 125, . . . 185, respectively. Data originating from, i.e., whose "home" location is, anyone of COMA caches/memories 114, 124, . . . 184 may be duplicated in attraction memory (AM) of system 100. For example, in COMA mode, a subsystem's cache includes both COMA cache/memories 114, 124, . . . 184 and L2$s 113a . . . 113i, 123a . . . 123i, and 183a . . . 183i, and data whose "home" is in cache memory 114 of subsystem 110 may be duplicated in one or more of cache memories 124, . . . 184 and may also be duplicated in one or more of L2$s 113a . . . 113i, 123a . . . 123i, and 183a . . . 183i. Alternatively,in NUMA mode, a subsystem's cache includes L2$s 113a . . . 113i, 123a . . . 123i, and 183a . . . 183i, and data whose "home" is in cache memory 114 of subsystem 110 may be duplicated in one or more of L2$s 113a . . . 113i, 123a . . . 123i, and 183a . . . 183i and possibly in L3$ 118.

In one embodiment of the present invention, as implemented in the exemplary hybrid COMA/NUMA computer system 100 of FIG. 1A, the "home" location of data is in COMA cache/memory 124 of subsystem 120, i.e., subsystem 120 is both the home and owner subsystem for the data. Copies of the data can also be stored in the attraction memory (AM) space of one or more of requesting subsystems, for example, in the AM space of requesting subsystem 110 by allocating space in COMA cache memory 114 and/or in hybrid second-level caches (L2$s) 113a, 113b, . . . 113i. See pending patent applications "A Hybrid NUMA Coma Caching System And Methods For Selecting Between The Caching Modes" by Hagersten et al., filed Dec. 22, 1995, Ser. No. 08/577,283, now U.S. Pat. No. 5,710,907 issued Jan. 20, 1998, and "A Hybrid NUMA Coma Caching System And Methods For Selecting Between The Caching Modes" by Wood et al., filed Dec. 22, 1995, Ser. No. 08/575,787. (Reference Number P1004) which describe in detail the hybrid COMA/NUMA architecture and methods for exploiting the hybrid cache architecture.

Home directory 126 is responsible for maintaining a master record of existing copies of the home page throughout system 100. In addition, memory tags (MTAGs) associated with the respective AM directories, e.g., directories 116 and 186, track the status of the local copies in each requesting subsystem using one of four exemplary states. An invalid ("I") state indicates that a particular subsystem does not have a (cached) copy of a data line of interest. A shared ("S") state indicates that the subsystem, and possibly other subsystems, have a shared (cached) copy of the data line of interest. An owned ("O") state indicates that the subsystem, and possibly other subsystems, have a (cached) copy of the data line of interest. The subsystem with the O copy is required to perform a write-back upon replacement. A modified ("M") state indicates that the subsystem has the only (cached) copy of the data line of interest, i.e., the subsystem is the sole owner of the data line and there are no S copies in the other subsystems.

In this example, as shown in FIG. 1A, COMA caches/ memories 114, 124, . . . 184 are separate from third level caches (L3$s) 118, 128 . . . 188. In this example, each of processors 111a, 111b, . . . 111i, 121a, 121b, . . . 121i, and 181a, 181b, . . . 181i also includes an internal first level cache (L1$) (not shown in FIG. 1A).

In accordance with one aspect of the invention, inclusion is maintained between the L1$s and the L2$s, but inclusion is not required between the L2$s and third level caches (L3$s). In other words, data that resides in a L1$ also resides in a respective L2$. However, data residing in the L1$ or L2$ do not necessarily have to reside in a respective L3$ as well. Thus, the L3$ may not allocate for a cache line of data even if space is allocated for the cache line of data in the L2$.

Figure 2:
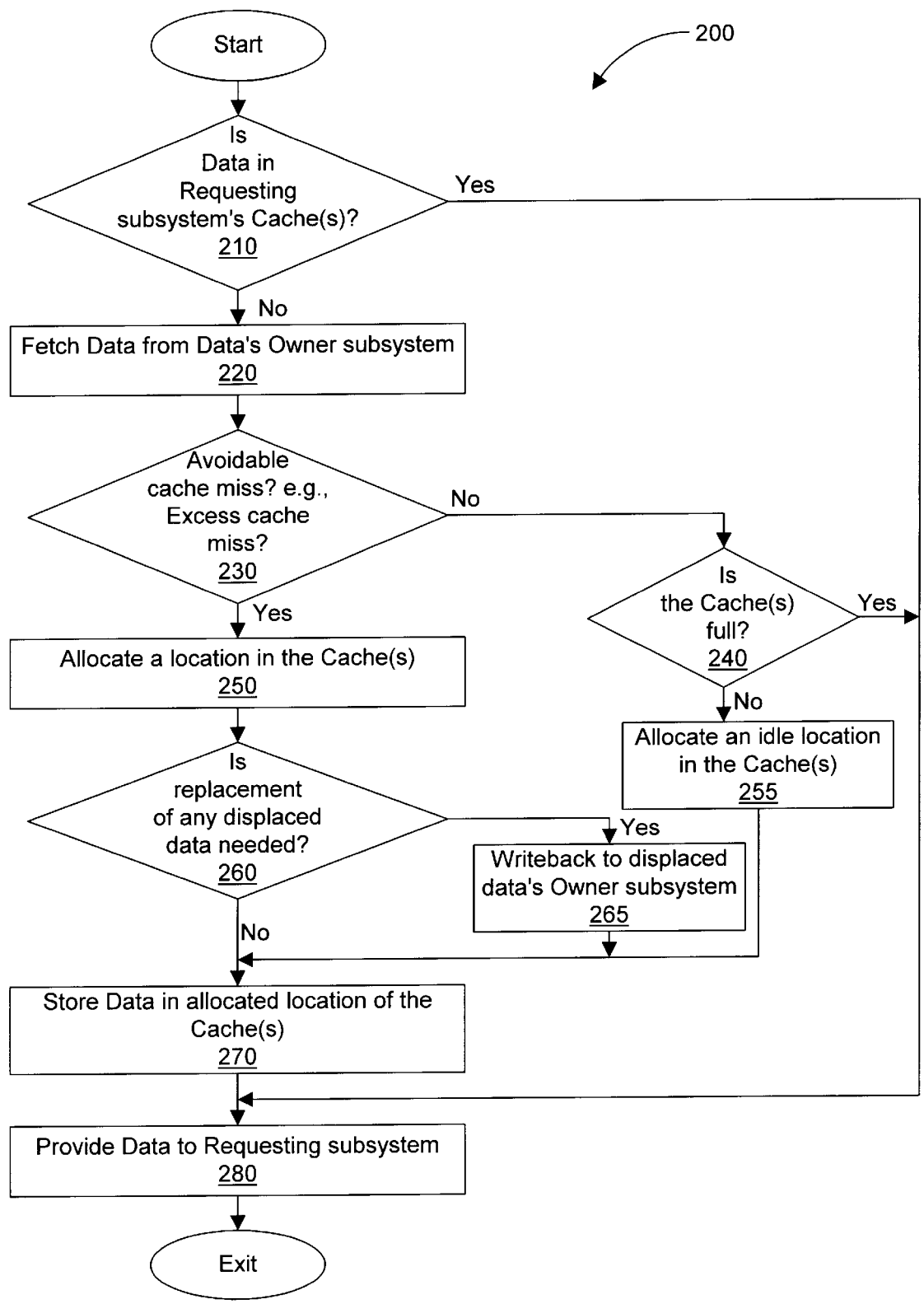
FIG. 2 is a flowchart illustrating one embodiment of the invention for a multiprocessor computer system.

FIG. 2 is a flowchart depicting one embodiment of the present invention as implemented on multiprocessor computer system 100. Note that for efficiency, both L2$ and L3$ allocate data one cache line at a time.

In the following description, the selection scheme is used to determine if a particular data structure should or should not be stored in L3$ 118 of requesting subsystem 110 in a hybrid COMA/NUMA environment. However, it is understood that the selection scheme can also be applicable to all levels of caches and to a variety of cache and system architectures. For example, although L3$ and COMA cache co-exist as separate caches in the following exemplary description, the invention is applicable to a NUMA-only (without COMA cache 114), to a COMA-only (without a NUMA caching mode) architecture with a more generic L3$, or to a L2$ co-existing with a L1$.

When processor 111a of requesting subsystem 110 makes a request for data, a search for the data is conducted in L2$ 113a and then in L3$ 118 (step 210). If the data is not found within requesting subsystem 110, i.e., a cache miss is detected by subsystem 110, a request is made to home subsystem 120 to fetch the data (step 220). U.S. Pat. No. 5,710,907 discloses how data is fetched from an owner subsystem by first interrogating the directory of the home subsystem.

Requesting subsystem 110 then attempts to determine if the cache miss is an "avoidable" cache miss (step 230). A cache miss is avoidable if cache miss could have been avoided had the data remained in the L3$ 118. One example of an avoidable cache miss is an "excess" cache miss which is defined as a cache miss preceded by a capacity miss or a conflict miss. Other causes of avoidable cache misses are also contemplated. These cache misses include cache misses which could have been avoidable by reconfiguring L3$ 118 to "free up" new cache space in L3$ 118 instead of replacing older data, by for example, dynamically resizing (increasing the size of) L3$ 118.

In this implementation, home directory 126 of home subsystem 120 maintains a list of requesting subsystem(s) with a shared (S) copy of the data stored in each cache line, for example in an array dir_share_bit [node]; wherein node=1 . . . n and n is the total number of subsystems. In addition, home directory 126 includes the identity of the current owner (owner_id) of the data in each cache line. Where there is no current owner, the owner_id identifies the last owner. Home directory 126 also includes a writeback bit (wb_bit) indicating whether the latest owner has written the data back to the memory or if it is still the owner. The last writer (last_write) of the data can be determined from the respective owner_id and the wb_bit fields in directory 126. Accordingly, an excess cache miss can be represented by a boolean equation such as:

(RTS & dir_share_bit [node]=1) OR (RTO & last_write=node)

wherein RTS is a read-to-share and RTO is a read-to-own

See U.S. Pat. No. 5,710,907 for a detailed description of an exemplary method of detecting excess cache misses. In one variation of the invention, directory 126 is a directory cache holding state information of the most recently accessed cache line. (See also co-pending application "directory-less protocol and related directory cache P1531). In this variation, only avoidable misses which have their respective entry in this directory cache can cause requesting subsystem 110 to allocate space in L3$ 118.

If requesting subsystem 110 detects an avoidable miss, then a suitable location is allocated in L3$ 118 for storing the data (step 250). The suitable location may be allocated by first looking for an idle location or a location containing invalid or stale data (step 260). If no idle nor invalid location can be found, then a used location is allocated and replacement of the displaced data may be needed. The used location may be selected at random among used locations. Alternatively, a selection criteria such as least-recently-used (LRU) or least-frequently-used (LFU) may be used to select a location from among used locations.

If replacement of the displaced data from the selected used location is required, requesting subsystem 110 sends the displaced data back to its owner subsystem (step 265). Pending application "A Hybrid NUMA Coma Caching System And Methods For Selecting Between The Caching Modes" by Hagersten et al., filed Dec. 22, 1995, Ser. No. 08/577,283. (Reference Number P1003) provides one example of replacing displaced data.

Conversely, if the cache miss is not an avoidable cache miss but there is an idle location in cache 118 (steps 230 and 240), then the idle location in cache 118 is allocated and the data is stored in the allocated location (steps 255 and 270). Otherwise, if the cache miss is not an avoidable cache miss and if cache 118 is full (steps 230 and 240), then the data is not cached in cache 118.

In each of the above cases, the data is provided to requesting processor 111a (step 280). Note that the data can be provided to requesting processor 111a anytime after the data has been fetched from owner subsystem 120, i.e., it can be provided before or after any required caching step 270.

Figure 3:
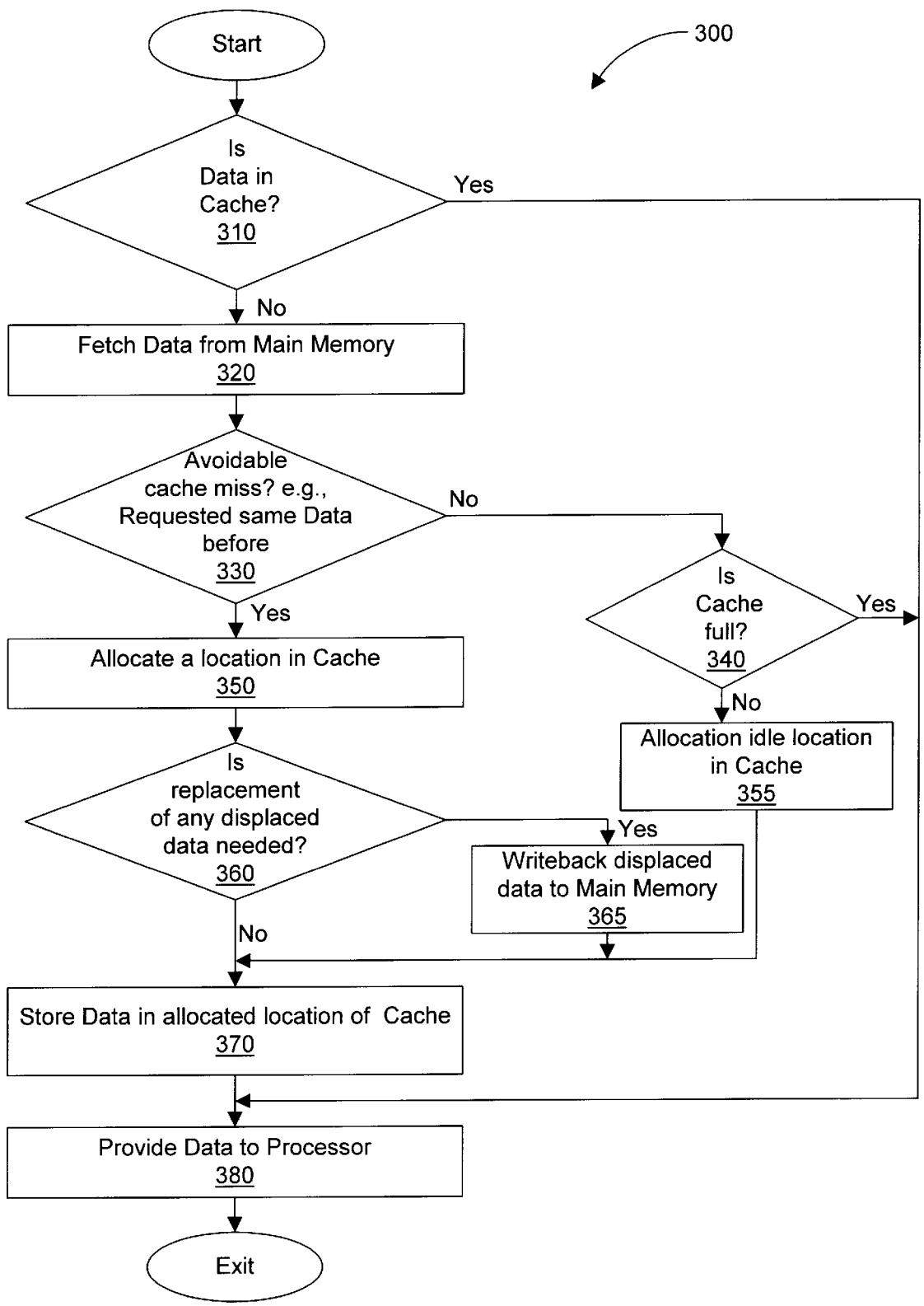
FIG. 3 is a flowchart illustrating another embodiment of the invention for a uniprocessor computer system.

FIG. 3 is a flowchart illustrating another embodiment of the present invention implemented in a uniprocessor computer system. Although the following description of the uniprocessor embodiment is based on a computer system having a processor, a cache and a main memory, the selection scheme is also applicable to any uniprocessor computer system with multiple caches and/or memories. For example, the main memory may be a higher-level cache.

When the processor makes a request for data, a search for the data is conducted in the cache (step 310). If the data is not found, i.e., a cache miss is detected, the processor fetches the data from the main memory (step 320).

Processor then attempts to determine if the cache miss is an "avoidable" cache miss (step 330). One example of an avoidable cache miss in a uniprocessor environment is when the same data had previously been requested by the processor and fetched from the main memory to the cache.

If the processor detects an avoidable miss, then a suitable location is allocated in the cache for storing the data (step 350). The suitable location may be allocated by first looking for an idle location or a location containing invalid or stale data (step 360). If no idle nor invalid location can be found, then a used location is allocated and replacement of the displaced data may be needed. The used location may be selected at random or using an algorithm such as LRU or LFU.

If replacement of the displaced data from the selected used location is required, the processor writes back the data to the main memory (step 365). Note that in both uniprocessor and multiprocessor systems where compulsory "write-through" of the cache(s) is enforced, displaced data can simply be discarded since the contents of the cache(s) and memory(s) are always coherent. "Copy-back" caches can also simply discard displaced data if the displaced data has not been modified.

Conversely, if the cache miss is not an avoidable cache miss and if the cache is not full (steps 330 and 340), then the processor allocates an idle location in the cache and the data is stored in the allocated location (steps 355 and 370). Otherwise, if the cache miss is not an avoidable cache miss and if the cache is full (steps 330 and 340), then the data is not cached.

In each of the above cases, the data is provided to the requesting processor (step 380). Note that the data can be provided to the requesting processor before or after any caching step 370.

Other modifications and additions are possible without departing from the spirit of the invention. For example, instead of caching a data structure after one avoidable cache miss, the data structure may be cached after the number of avoidable cache misses has exceeded a threshold. In another modification, a younger data structure may be cached only if the number of excess misses of the younger data structure exceeds the number of cache hits of an older data structure selected for displacement. Hence, the scope of the invention should be determined by the following claims.

What is claimed is:

1. A method for selecting data to be cached in a computer system having a cache and a main memory, the method comprising the steps of:
    searching for said data in said cache;
    detecting a cache miss when said data cannot be found in said cache; and
    if said cache miss is detected, then:
        fetching said data from said main memory;
        determining if said cache miss is an avoidable cache miss; and
    if said cache miss is determined to be said avoidable cache miss, then caching said data in said cache.

2. The method of claim 1 further comprising the step of writing back any older data displaced from said cache to said main memory as a result of caching said data.

3. The method of claim 1 wherein said avoidable cache miss is an excess cache miss.

4. The method of claim 3 wherein said excess cache miss is a capacity miss of said data.

5. The method of claim 3 wherein said excess cache miss is a conflict miss of said data.

6. The method of claim 5 wherein a count of said avoidable cache miss(es) of said data and a count of cache hit(s) of older data are maintained, and wherein said data is cached and said older data is written back only if said count of said avoidable cache miss(es) exceeds said count of said cache hit(s).

7. A method for selecting data to be cached in a computer system including at least a first subsystem and a second subsystem, each said subsystem including a cache, said second subsystem is a home subsystem of the data, the method comprising the steps of:
    searching for said data in said cache of said first subsystem;
    detecting a cache miss when said data cannot be found in said cache of said first subsystem; and
    if said cache miss is detected, then:
    fetching said data from said second subsystem to said first subsystem;
        determining if said cache miss is an avoidable cache miss; and
    if said cache miss is determined to be said avoidable cache miss, then caching said data in said cache of said first subsystem.

8. The method of claim 7 further comprising the step of writing back any older data displaced from said first subsystem to said second subsystem as a result of caching said data.

9. The method of claim 8 wherein a count of said avoidable cache miss(es) of said data and a count of cache hit(s) of older data are maintained, and wherein said data is cached and said older data is written back only if said count of said avoidable cache miss(es) exceeds said count of said cache hit(s).

10. The method of claim 7 wherein said avoidable cache miss is an excess cache miss.

11. The method of claim 10 wherein said excess cache miss is a capacity miss of said data.

12. The method of claim 11 wherein said excess cache miss is a conflict miss of said data.

13. The method of claim 10 wherein said home subsystem maintains a list of said subsystem(s) which has a shared copy of said data and an identity of a last writer of said data, and wherein said access cache miss is detected when said fetching step includes sending a read-to-share request for said data to said second subsystem, and said list indicates that said first subsystem had previously fetched a shared copy of said data.

14. The method of claim 10 wherein said home subsystem maintains a list of said subsystem(s) which have a shared copy of said data and an identity of a last writer of said data, and wherein said access cache miss is detected when said fetching step includes sending a read-to-own request for said data to said second subsystem, and said first subsystem was said last writer of said data.

15. The method of claim 14 wherein said home subsystem also maintains an identity of said last owner of said data, and an indicator indicating whether said last owner has copied said data back to said home subsystem, and wherein said last writer is determined by examining the identity of said last owner and said indicator.

16. A computer system comprising:
   a cache;
   a main memory coupled to said cache; and
   a fetcher coupled between said cache and said main memory, said fetcher configured to fetch data from said main memory to said cache when an avoidable cache miss of said data occurs in said cache.

17. The computer system of claim 16 wherein said avoidable cache miss is an excess cache miss.

18. The computer system of claim 17 wherein said excess cache miss is a capacity miss of said data.

19. The computer system of claim 17 wherein said excess cache miss is a conflict miss of said data.

20. The computer system of claim 17 wherein said fetcher is further configured to write back any older data displaced from said cache to said main memory.

21. A caching system for a computer system comprising:
   a first cache associated with a first subsystem of said computer system;
   a second cache associated with a second subsystem of said computer system, said second subsystem is a home subsystem of data;
   a fetcher coupled between said first cache and said second cache, said fetcher configured to fetch said data from said second cache to said first cache when an avoidable cache miss of said data occurs in said first cache.

22. The caching system of claim 21 wherein said avoidable cache miss is an excess cache miss.

23. The caching system of claim 22 wherein said excess cache miss is a capacity miss of said data.

24. The caching system of claim 22 wherein said excess cache miss is a conflict miss of said data.

25. The caching system of claim 22 wherein said fetcher is further configured to write back any displaced data from said first cache to a home subsystem of said displaced data.

26. The caching system of claim 22 wherein said home subsystem includes a list of subsystem(s) of said computer system which has a shared copy of said data and an identity of a last writer of said data, and wherein said access cache miss is detected when said first subsystem sends a read-to-share request for said data to said second subsystem, and said list indicates that said first subsystem had previously fetched a shared copy of said data.

27. The caching system of claim 22 wherein said home subsystem includes a list of subsystem(s) of said computer system which has a shared copy of said data and an identity of a last writer of said data, and wherein said access cache miss is detected when said first subsystem sends a read-to-own request for said data to said second subsystem, and said first subsystem was said last writer of said data.

28. The caching system of claim 27 wherein said home subsystem includes an identifier of said last owner of said data, and an indicator indicating whether said last owner has copied said data back to said home subsystem, and wherein said last writer is determined by examining the identifier of said last owner and said indicator.

* * * * *

UNITED STATES PATENT AND TRADEMARK OFFICE
CERTIFICATE OF CORRECTION

PATENT NO. : 5,893,150

DATED : April 6, 1999

INVENTOR(S) : Erik E. Hagersten and Mark D. Hill

It is certified that error appears in the above-indentified patent and that said Letters Patent is hereby corrected as shown below:

Claim 12, col 7, line 11, please change "11" to "10".

Signed and Sealed this

Twelfth Day of October, 1999

Attest:

Q. TODD DICKINSON

*Attesting Officer*    *Acting Commissioner of Patents and Trademarks*